United States Patent

Majumdar et al.

(10) Patent No.: US 9,569,604 B2
(45) Date of Patent: Feb. 14, 2017

(54) USER ACCESS CONTROL TO A SECURED APPLICATION

(71) Applicant: International Business Machines Corporation, Armonk, NY (US)

(72) Inventors: Gautam Majumdar, Wappingers Falls, NY (US); Tarun K. Saha, Fishkill, NY (US); Michael Q. Wang, Irving, TX (US)

(73) Assignee: International Business Machines Corporation, Armonk, NY (US)

( * ) Notice: Subject to any disclaimer, the term of this patent is extended or adjusted under 35 U.S.C. 154(b) by 188 days.

(21) Appl. No.: 13/862,516

(22) Filed: Apr. 15, 2013

(65) Prior Publication Data

US 2014/0310789 A1    Oct. 16, 2014

(51) Int. Cl.
  *G06F 7/04* (2006.01)
  *G06F 21/31* (2013.01)

(52) U.S. Cl.
  CPC ....... *G06F 21/31* (2013.01); *G06F 2221/2115* (2013.01)

(58) Field of Classification Search
  CPC ........................................................ H04L 63/10
  USPC ........................................................ 726/26–30
  See application file for complete search history.

(56) References Cited

U.S. PATENT DOCUMENTS

| | | | |
|---|---|---|---|
| 7,376,827 B1 | 5/2008 | Jiao | |
| 7,516,157 B2 | 4/2009 | Cameron et al. | |
| 8,181,016 B1 * | 5/2012 | Borgia | G06F 21/604 713/156 |
| 8,732,479 B1 * | 5/2014 | Henriksen | G06F 11/1464 709/201 |
| 2003/0120502 A1 * | 6/2003 | Robb | G06Q 30/04 705/34 |
| 2003/0131232 A1 | 7/2003 | Fraser et al. | |
| 2005/0060565 A1 * | 3/2005 | Chebolu | G06F 9/44505 726/26 |
| 2006/0095779 A9 * | 5/2006 | Bhat | H04L 67/02 713/182 |
| 2008/0133594 A1 | 6/2008 | Fotinatos et al. | |

(Continued)

OTHER PUBLICATIONS

Schafer et al., "Enabling an integrated identity from disparate sources," IBM Journal of Research and Development Year: 2012, vol. 56, Issue: 6 pp. 6:1-6:10.*

(Continued)

*Primary Examiner* — Roderick Tolentino
(74) *Attorney, Agent, or Firm* — John R. Pivnichny; Hunter E. Webb; Keohane & D'Alessandro PLLC

(57) ABSTRACT

Embodiments described herein provide approaches for user access control to a secured application. Specifically, a custom authentication tool is configured to intercept a request from a user for access to a secured application and override one or more default requirements (e.g., application pre-registration, for accessing the application). That is, when credentials of the user are received at the authentication tool, they are verified against data within a user directory to generate a user profile, which is then provided to the secured application to satisfy the requirements for granting access to the user. As such, the secured application's requirements are met, yet users do not have to manually pre-register to obtain access because the registration is performed in the background by the authentication tool.

15 Claims, 4 Drawing Sheets

(56) References Cited

U.S. PATENT DOCUMENTS

| | | | | |
|---|---|---|---|---|
| 2008/0148351 A1* | 6/2008 | Bhatia | ............... | G06F 21/6218 |
| | | | | 726/2 |
| 2013/0091265 A1* | 4/2013 | Baleh | ................... | H04L 67/306 |
| | | | | 709/223 |
| 2013/0198866 A1* | 8/2013 | Li | ........................ | G06F 21/105 |
| | | | | 726/29 |
| 2013/0217363 A1* | 8/2013 | Myers | ................... | G06Q 50/01 |
| | | | | 455/414.1 |

OTHER PUBLICATIONS

Cheng, E.C., "An object-oriented organizational model to support dynamic role-based access control in electronic commerce applications," Systems Sciences, 1999. HICSS-32. Proceedings of the 32nd Annual Hawaii International Conference on Year: 1999, vol. Track8 p. 9 pp.*

Baum, D., "Security on the Move," as published in Oracle magazine (Sep./Oct. 2012), 3 pages.

"Why Deploy an Enterprise Directory?", www.isode.com, 7 pages. No authors cited. Publication date not cited.

* cited by examiner

USER ACCESS CONTROL TO A SECURED APPLICATION

TECHNICAL FIELD

This invention relates generally to security in an information technology (IT) environment and, more specifically, to access control of a secured application.

BACKGROUND

Security of information, assets, and people is a desired objective. Sensitive applications can be secured in part by managing access to such applications, including access to electronic information, networks, devices associated with networks, and information systems associated therewith. Managing access can include, for example, requiring authentication or access credentials before allowing access to such information, networks, devices, and information systems. Further, many business web/internet applications require users to pre-register and generate a user profile before the user is allowed to access the application. However, it becomes unnecessarily time consuming for the user to manually pre-register each time prior to accessing the business application. Therefore, what is needed is a solution that solves one or more deficiencies of the prior art.

SUMMARY

In general, embodiments of the invention provide approaches for user access control to a secured application. Specifically, a custom authentication tool is configured to intercept a request from a user for access to a secured application and to override one or more default requirement, e.g., application pre-registration, for accessing the application. For example, when credentials of the user are received at the authentication tool, they are verified against data within a user directory to generate a user profile, wherein the user directory is located external to the secured application. The user profile is then provided to the secured application to satisfy the requirements for granting access to the user. As such, the secured application's requirements are met, yet users do not have to manually pre-register to obtain access because the registration is performed in the background by the authentication tool.

One aspect of the present invention includes a method for user access control to a secured application, the method comprising the computer-implemented steps of: receiving a request to access a secured application from a user, the secured application having a set of requirements for granting access to the user; receiving user credentials from the user; verifying the user credentials against data within a user directory; generating a user profile for the user from the data within the user directory; and providing the user profile to the secured application to satisfy the set of requirements for granting access to the user.

Another aspect of the present invention provides a system for user access control to a secured application, the system comprising: memory operably associated with at least one processing unit; and an authentication tool stored within the memory and operable with the at least one processing unit via a bus that when executing the instructions, causes the system to: receive a request to access a secured application from a user, the secured application having a set of requirements for granting access to the user; receive user credentials from the user; verify the user credentials against data within a user directory; generate a user profile for the user from the data within the user directory; and provide the user profile to the secured application to satisfy the set of requirements for granting access to the user.

Another aspect of the present invention provides a computer-readable storage medium storing computer instructions, which when executed, enables a computer system to provide user access control to a secured application, the computer instructions comprising: receiving a request to access a secured application from a user, the secured application having a set of requirements for granting access to the user; receiving user credentials from the user; verifying the user credentials against data within a user directory; generating a user profile for the user from the data within the user directory; and providing the user profile to the secured application to satisfy the set of requirements for granting access to the user.

Another aspect of the present invention provides a method for providing user access control to a secured application, the method comprising: receiving, at a computer system, a request to access a secured application from a user, the secured application having a set of requirements for granting access to the user; receiving, at the computer system, user credentials from the user; verifying, by the computer system, the user credentials against data within a user directory; generating, by the computer system, a user profile for the user from the data within the user directory; and providing, by the computer system, the user profile to the secured application to satisfy the set of requirements for granting access to the user.

Figure 1:
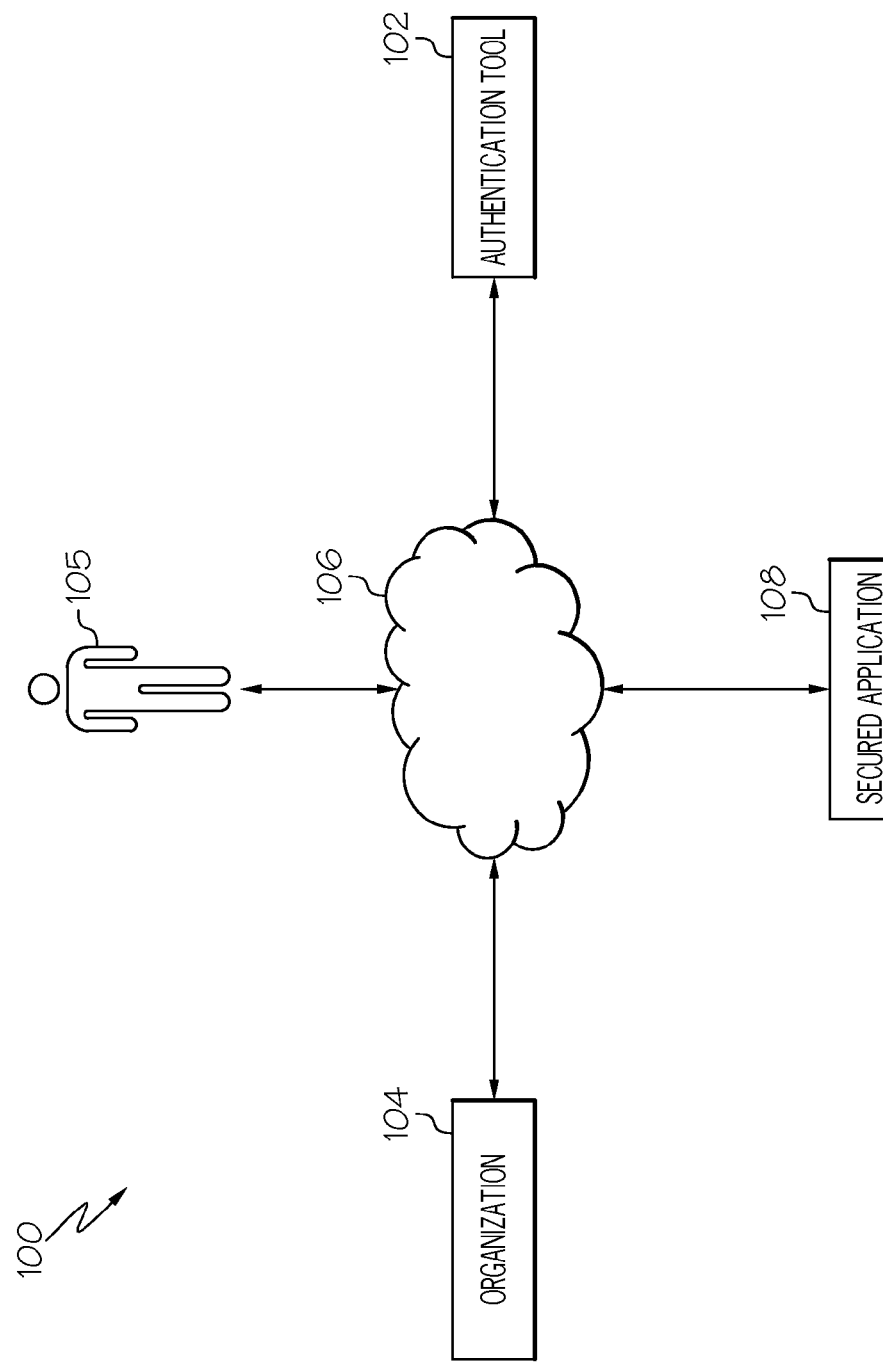
FIG. 1 shows a pictorial representation of a network in which aspects of the illustrative embodiments may be implemented.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Exemplary embodiments now will be described more fully herein with reference to the accompanying drawings, in which exemplary embodiments are shown. Embodiments of the invention provide approaches for user access control to a secured application. Specifically, a custom authentication tool is configured to intercept a request from a user for access to a secured application and to override one or more default requirements (e.g., application pre-registration, for accessing the application). For example, when credentials of the user are received at the authentication tool, they are verified against data within a user directory to generate a user profile, wherein the user directory is located external to the secured application. The user profile is then provided to the secured application to satisfy the requirements for granting access to the user. As such, the secured application's requirements are met, yet users do not have to manually pre-register to obtain access because the registration is performed in the background by the authentication tool.

It will be appreciated that this disclosure may be embodied in many different forms and should not be construed as limited to the exemplary embodiments set forth herein. Rather, these exemplary embodiments are provided so that this disclosure will be thorough and complete and will fully convey the scope of this disclosure to those skilled in the art. The terminology used herein is for the purpose of describing particular embodiments only and is not intended to be limiting of this disclosure. For example, as used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Reference throughout this specification to "one embodiment," "an embodiment," "embodiments," or similar language means that a particular feature, structure, or characteristic described in connection with the embodiment is included in at least one embodiment of the present invention. Thus, appearances of the phrases "in one embodiment," "in an embodiment," "in embodiments" and similar language throughout this specification may, but do not necessarily, all refer to the same embodiment.

With reference now to the figures, FIG. 1 depicts a system 100 that facilitates management of access to a secured application (e.g., a web-based business application). System 100 can include an authentication tool 102 that can comprise one or more components and/or servers for managing access to secured application 108 connected to a network 106. One or more computers can be employed to implement the functions of authentication tool 102, for example. Authentication tool 102 can receive access requests to secured application 108 from one or more users 105. In this embodiment, secured application 108 is associated with and controlled by an organization 104 (e.g., a company that owns/provides secured application 108).

System 100 contains network 106, which is the medium used to provide communications links between each component. Network 106 may include connections, such as wire, wireless communication links, fiber optic cables, a cloud computing environment, etc. System 100 also may be implemented as a number of different types of networks, such as, for example, an intranet, a local area network (LAN), or a wide area network (WAN). It will be appreciated that FIG. 1 is intended as an example, and not as an architectural limitation for different embodiments.

Figure 2:
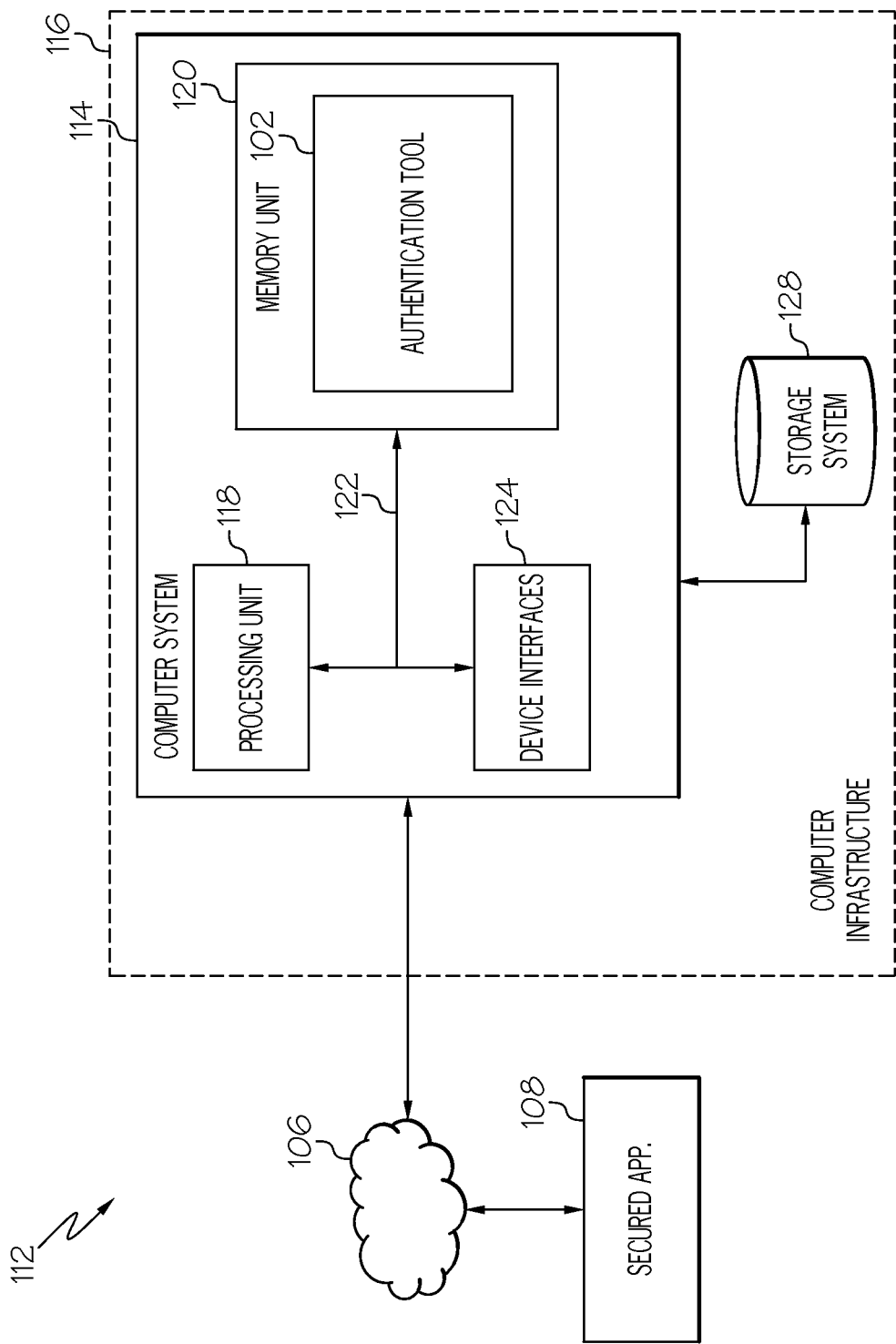
FIG. 2 shows a schematic of an exemplary computing environment according to illustrative embodiments.

Referring now to FIG. 2, a computerized implementation 112 of exemplary embodiments will be described in greater detail. As depicted, implementation 112 includes computer system 114 deployed within a computer infrastructure 116. This is intended to demonstrate, among other things, that embodiments can be implemented within network environment 106 (e.g., the Internet, a wide area network (WAN), a local area network (LAN), a virtual private network (VPN), etc.), or on a stand-alone computer system. Still yet, computer infrastructure 116 is intended to demonstrate that some or all of the components of implementation 112 could be deployed, managed, serviced, etc., by a service provider who offers to implement, deploy, and/or perform the functions of the present invention for others.

Computer system 114 is intended to represent any type of computer system that may be implemented in deploying/realizing the teachings recited herein. In this particular example, computer system 114 represents an illustrative system for providing enhanced IT security. It should be understood that any other computers implemented under various embodiments may have different components/software, but will perform similar functions. As shown, computer system 114 includes a processing unit 118 capable of operating with authentication tool 102 stored in a memory unit 120 to provide user access control to a secured application, as will be described in further detail below. Also shown is a bus 122, and device interfaces 124.

Processing unit 118 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 118 receives user credential information from authentication tool 102 and communicates it to secured application 108. The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 118 executes computer program code, such as program code for operating authentication tool 102, which is stored in memory unit 120 and/or storage system 128. While executing computer program code, processing unit 118 can read and/or write data to/from memory unit 120 and storage system 128. Storage system 128 can include VCRs, DVRs, RAID arrays, USB hard drives, optical disk recorders, flash storage devices, and/or any other data processing and storage elements for storing and/or processing data. Although not shown, computer system 114 could also include I/O interfaces that communicate with one or more hardware components of computer infrastructure 116 that enable a user to interact with computer system 114 (e.g., a keyboard, a display, camera, etc.).

Figure 3:
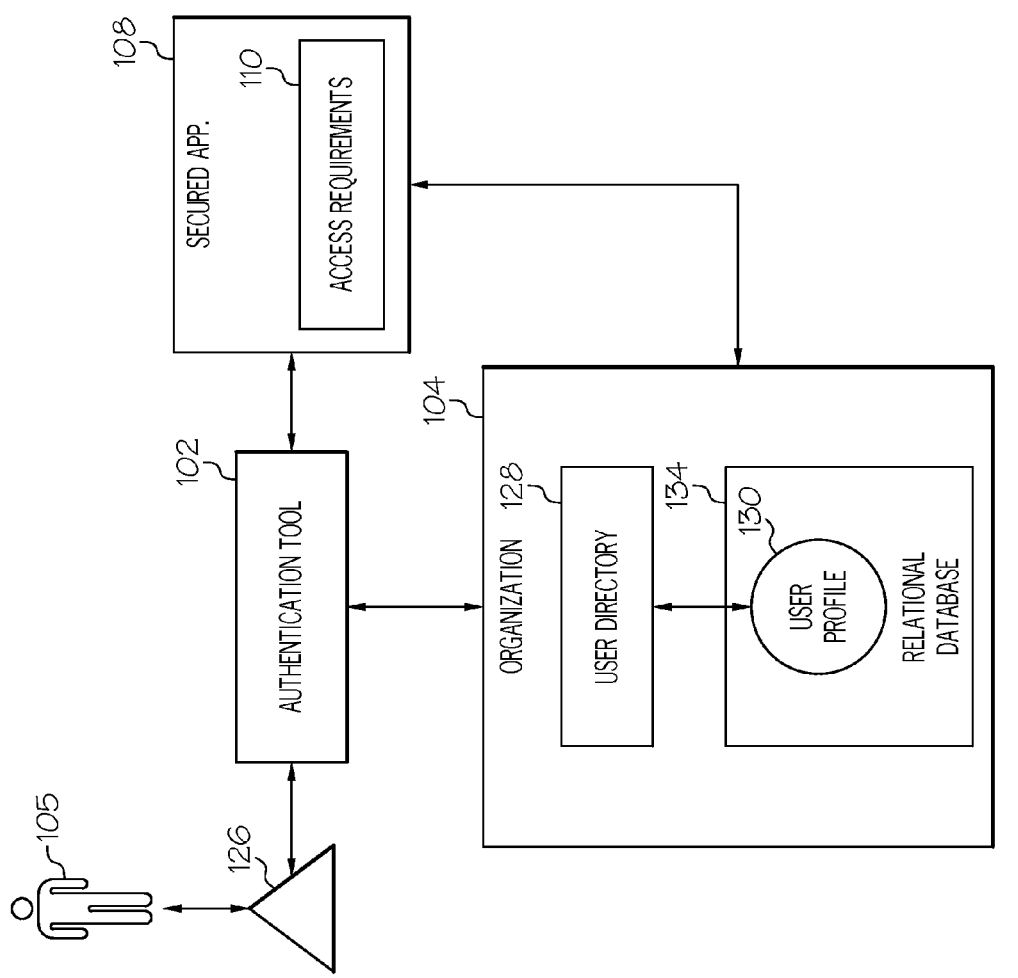
FIG. 3 shows an architecture in which user access control to a secured application is implemented according illustrative embodiments.

Referring now to FIG. 3, the structure and operation of authentication tool 102, organization 104, and secured application 108 will be described in greater detail. Although not limiting, embodiments herein will be described based on a scenario in which secured application 108 is a business application over which organization 104 has authority. In this case, secured application requires all users to be pre-registered and have a profile (e.g., with name, e-mail address, physical address, employee title, etc.) prior to being provided access. Meanwhile, organization 104 maintains and manages a user directory 128 (e.g., an employee corporate directory) and may wish to allow any employee listed in user directory 128 to be given access to secured application 108 without the need for prior registration. To facilitate this, authentication tool 102 is configured to receive a request (i.e., a uniform resource locator (URL) in a browser) to access secured application 108, and to receive user credentials 126 from user 105 prior to accessing secured application 108. In one embodiment, user credentials 126 include a user name/password assigned by organization 104 for user 105 to gain access to any number of secured accounts, profiles, files, locations, applications, etc., within organization 104. User credentials 126 may also be obtained from card readers, biometric readers, keypads, etc.

Next, if it's determined that user 105 has not previously registered with secured application 108, authentication tool 102 verifies user credentials 126 against data within user directory 128 of organization 104. For example, verification may provide a positive identification of user 105 based on the entered username/password. If so, authentication tool 102 generates a user profile 130 for user 105 from the data within user directory 128. User profile 130 may include user name, e-mail address, physical address, employee title, or any number of additional attributes or identifiers for user 105. User profile 130 can be customized with any required information for user 105 to access secured application 108. In one embodiment, authentication tool 102 can reference table(s) and/or list(s) that can include information associated with application access, such as network access credential information, network access policies, and the like. User profile 130 is stored in an application repository 134 (e.g., a relational database), and is then provided to secured application 108 to satisfy a set of access requirements 110 for granting access to user 105. After receiving user profile 130, secured application 108 may follow it's normal authorization flow, and allow user 105 access to secured application 108 without registration.

It will be appreciated that authentication tool 102 can facilitate enforcement of access policies as it pertains to each secured application and each respective user. Furthermore, embodiments disclosed herein are not limited to a single user and associated user profile. Rather, authentication tool 102 can generate and enforce IT security measures for any number of users. Authentication tool 102 can generate IT control policies that govern application access by respective users disposed in network 106 (FIG. 1), and can enforce such polices.

Figure 4:
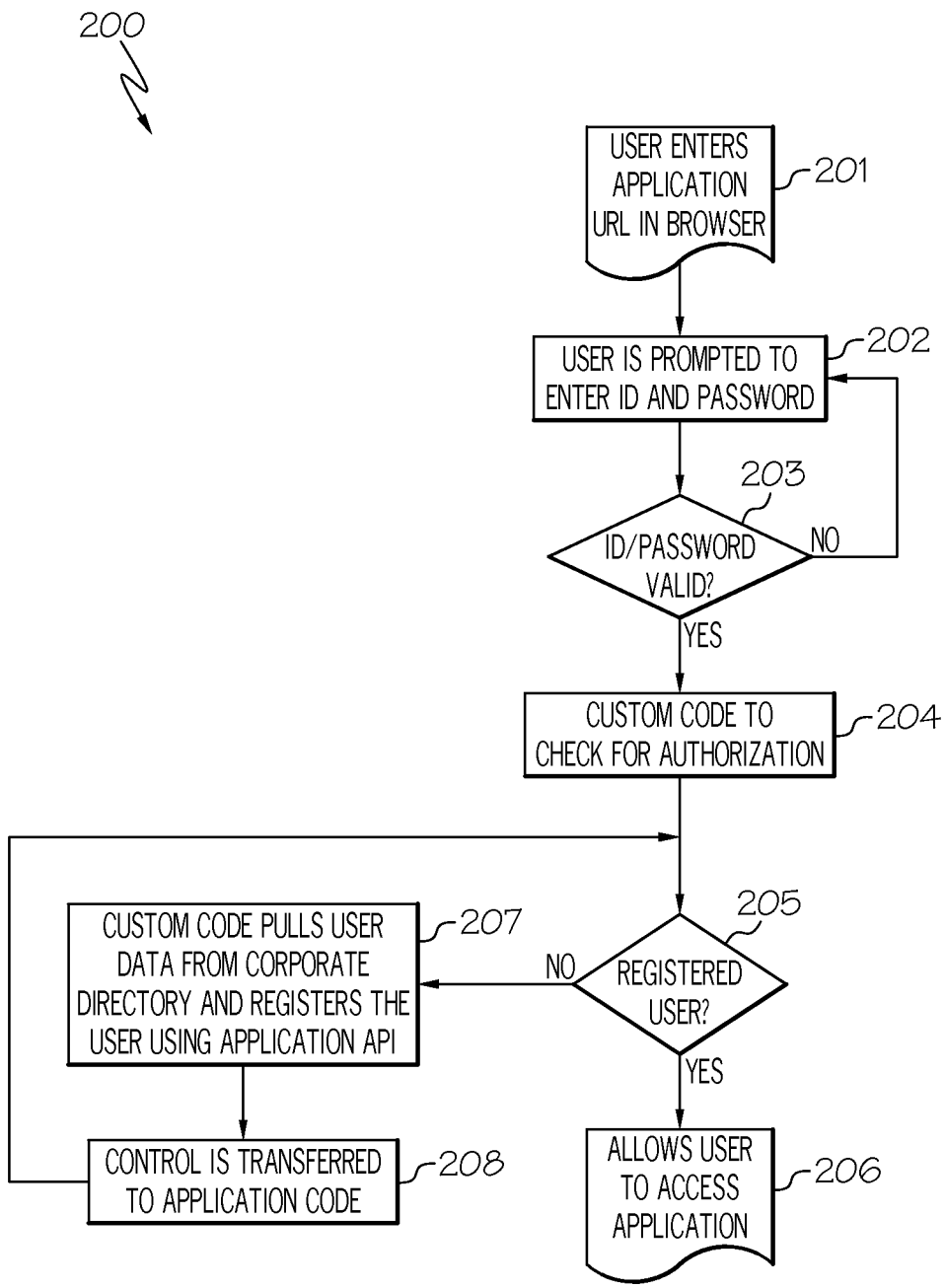
FIG. 4 shows a process flow for providing user access control to a secured application according to illustrative embodiments.

As depicted in FIG. 4, one or more computer systems carry out the methodologies disclosed herein. Shown is a method 200 for user access control to a secured application. At 201, the user enters the application URL in a web-browser. At 202, the user is prompted to enter ID/password. At 203, it is determined whether the ID and password are valid. If yes, at 204 the custom code of authentication tool 102 (FIG. 3) checks for authorization. If, at 205, the user is registered, the user is allowed access to the secured application. However, if the user is not registered, at 207 the custom code of authentication tool 102 pulls user data from a corporate directory and registers the user using the application API. At 208, control is transferred to the application code to provide access to the secured application by the user. That is, the authentication tool overrides the default application settings of the secured application, which are generally more rigid. However, the secured application's requirements are still met, and the user does not have to manually pre-register to obtain access.

The flowchart of FIG. 4 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

It can also be appreciated that the approaches disclosed herein can be used within a computer system to provide user access control to a secured application. In this case, authentication tool 102 can be provided, and one or more systems for performing the processes described in the invention can be obtained and deployed to computer infrastructure 116. To this extent, the deployment can comprise one or more of (1) installing program code on a computing device, such as a computer system, from a computer-readable storage medium; (2) adding one or more computing devices to the infrastructure; and (3) incorporating and/or modifying one or more existing systems of the infrastructure to enable the infrastructure to perform the process actions of the invention.

The exemplary computer system 114 may be described in the general context of computer-executable instructions, such as program modules, being executed by a computer. Generally, program modules include routines, programs, people, components, logic, data structures, and so on, that perform particular tasks or implement particular abstract data types. Exemplary computer system 114 may be practiced in distributed computing environments where tasks are performed by remote processing devices that are linked through a communications network. In a distributed computing environment, program modules may be located in both local and remote computer storage media including memory storage devices.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, as will be described herein, systems/units may also be implemented as a combination of software and one or more hardware devices. For instance, authentication tool 102 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

For example, an implementation of exemplary computer system 114 (FIG. 2) may be stored on or transmitted across some form of computer-readable storage medium. Computer-readable storage medium can be media that can be accessed by a computer. "Computer-readable storage medium" includes volatile and non-volatile, removable and non-removable computer storable media implemented in any method or technology for storage of information such as computer readable instructions, data structures, program modules, or other data. Computer storage device includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer. "Communication medium" typically embodies computer readable instructions, data structures, and program modules. Communication media also includes any information delivery media.

It is apparent that there has been provided approaches for providing access control to a secured application. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method for user access control to a secured application, the method comprising the computer-implemented steps of:
   receiving a request to remotely access a secured application from a user, the secured application having a set of requirements for granting access to the user, the set of requirements for granting access to the secured application comprises a requirement that the user registers with the secured application each time the user remotely accesses the secured application and a requirement that the user has a recognized user profile;
   receiving user credentials from the user;
   verifying the user credentials against data within an employee directory to identify the user as a member of an organization controlling the secured application;
   determining, in response to the user credentials being verified, that the member does not currently have access to the secured application due to a lack of a recognized user profile, the user profile including a plurality of fields that each have personal attributes that are specific to the member:
   generating the user profile for the member by transferring each of a plurality of personal attributes that are specific to the employee from the data within the employee directory to corresponding fields within the user profile in response to the determination that the employee does not currently have access to the secured application; and
   providing the user profile to the secured application to satisfy the set of requirements for granting access to the user without registration;
   generating, in response to a request for the member to remotely access a second secured application and a determination that the member does not currently have access to the second secured application due to a lack of a recognized user profile for the second secured application, the user profile for the second secured application for the member by transferring each of a plurality of personal attributes that are specific to the employee from the data within the employee directory to corresponding fields within the user profile for the second secured application; and
   providing the user profile for the second secured application to the second secured application to satisfy the set of requirements for granting access to the user without registration.

2. The method according to claim 1, wherein the secured application is a business application associated with an organization that manages the employee directory.

3. The method according to claim 1, further comprising storing the user profile in a relational database.

4. The method according to claim 2, wherein the business application is a web-based application.

5. The method according to claim 4, wherein the receiving the request to access the secured application from the user comprises receiving a uniform resource locator in a browser for the web-based application.

6. A system for user access control to a secured application, the system comprising:
   memory connected with at least one processing unit; and
   an authentication tool stored within the memory and operable with the at least one processing unit via a bus that when executing instructions, causes the system to:

receive a request to remotely access a secured application from a user, the secured application having a set of requirements for granting access to the user, the set of requirements for granting access to the secured application comprises a requirement that the user registers with the secured application each time the user remotely accesses the secured application and a requirement that the user has a recognized user profile; receive user credentials from the user;

verify the user credentials against data within an employee directory to identify the user as a member of an organization controlling the secured application;

determine, in response to the user credentials being verified, that the member does not currently have access to the secured application due to a lack of a recognized user profile, the user profile including a plurality of fields that each have personal attributes that are specific to the member generate the user profile for the member by transferring each of a plurality of personal attributes that are specific to the employee from the data within the employee directory to corresponding fields within the user profile in response to the determination that the employee does not currently have access to the secured application; and provide the user profile to the secured application to satisfy the set of requirements for granting access to the user without registration;

generate, in response to a request for the member to remotely access a second secured application and a determination that the member does not currently have access to the second secured application due to a lack of a recognized user profile for the second secured application, the user profile for the second secured application for the member by transferring each of a plurality of personal attributes that are specific to the employee from the data within the employee directory to corresponding fields within the user profile for the second secured application; and provide the user profile for the second secured application to the second secured application to satisfy the set of requirements for granting access to the user without registration.

7. The system according to claim 6, wherein the secured application is a business application associated with an organization that manages the employee directory.

8. The system according to claim 6, further comprising instructions causing the system to store the user profile in a relational database.

9. The system according to claim 7, wherein the business application is a web-based application.

10. The system according to claim 9, the instructions for receiving the request to access the secured application from the user comprising receiving a uniform resource locator in a browser for the web-based application.

11. A computer-readable storage device storing computer instructions, which when executed, enables a computer system to provide user access control to a secured application, the computer instructions comprising:

receiving a request to remotely access a secured application from a user, the secured application having a set of requirements for granting access to the user, the set of requirements for granting access to the secured application comprises a requirement that the user registers with the secured application each time the user remotely accesses the secured application and a requirement that the user has a recognized user profile;

receiving user credentials from the user;

verifying the user credentials against data within an employee directory to identify the user as a member of an organization controlling the secured application;

determining, in response to the user credentials being verified, that the member does not currently have access to the secured application due to a lack of a recognized user profile, the user profile including a plurality of fields that each have personal attributes that are specific to the member;

generating the user profile for the member by transferring each of a plurality of personal attributes that are specific to the employee from the data within the employee directory to corresponding fields within the user profile in response to the determination that the employee does not currently have access to the secured application; and providing the user profile to the secured application to satisfy the set of requirements for granting access to the user without registration;

generating, in response to a request for the member to remotely access a second secured application and a determination that the member does not currently have access to the second secured application due to a lack of a recognized user profile for the second secured application, the user profile for the second secured application for the member by transferring each of a plurality of personal attributes that are specific to the employee from the data within the employee directory to corresponding fields within the user profile for the second secured application; and providing the user profile for the second secured application to the second secured application to satisfy the set of requirements for granting access to the user without registration.

12. The computer-readable storage device according to claim 11 wherein the secured application is a business application associated with an organization that manages the employee directory.

13. The computer-readable storage device according to claim 11, the computer instructions further comprising storing the user profile in a relational database.

14. The computer-readable storage device according to claim 12, wherein the business application is a web-based application.

15. The computer-readable storage device according to claim 14, the computer instructions for receiving the request to access the secured application from the user comprising receiving a uniform resource locator in a browser for the web-based application.

* * * * *